US005517864A

United States Patent [19]

Seppa

[11] Patent Number: 5,517,864
[45] Date of Patent: May 21, 1996

[54] POWER TRANSMISSION LINE TENSION MONITORING SYSTEM

[76] Inventor: Tapani O. Seppa, 39 N. Valley Rd., Ridgefield, Conn. 06877

[21] Appl. No.: 251,242

[22] Filed: May 31, 1994

[51] Int. Cl.⁶ .................................................. G01L 5/04
[52] U.S. Cl. ................................. 73/862.391; 324/106
[58] Field of Search ...................... 73/862.391, 862.541; 324/105, 106, 127; 307/62; 340/870.3; 174/40 R, 40 TD, 45 R, 45 TD, 149 R; 364/492, 508, 550, 556

[56] References Cited

U.S. PATENT DOCUMENTS

| | | | |
|---|---|---|---|
| 3,073,156 | 1/1963 | Rowe | 73/862.39 |
| 3,098,988 | 7/1963 | Hafner | 73/862.39 |
| 4,402,229 | 9/1983 | Byrne | 73/862.39 |
| 4,409,429 | 10/1983 | Gaylard | 174/43 |
| 4,686,325 | 8/1987 | Marsico et al. | 174/40 R |
| 4,786,862 | 11/1988 | Sieron | 324/126 |
| 4,806,855 | 2/1989 | Davis | 324/127 |
| 5,140,257 | 8/1992 | Davis | 324/106 |
| 5,235,861 | 8/1993 | Seppa | 73/862.54 X |
| 5,341,088 | 8/1994 | Davis | 324/106 |

*Primary Examiner*—Richard E. Chilcot, Jr.
*Assistant Examiner*—Elizabeth L. Dougherty
*Attorney, Agent, or Firm*—Edward R. Hyde

[57] ABSTRACT

A system for determining the sag of an overhead power transmission line to prevent flashover to adjacent objects on earth. Power line tension is measured as well as ambient temperature at two different times. From these measurements the Ruling Span of a power line can be calculated from which a determination can be made of the maximum safe current to avoid unsafe line sag.

4 Claims, 2 Drawing Sheets

POWER TRANSMISSION LINE TENSION MONITORING SYSTEM

BACKGROUND OF THE INVENTION

1. Field of The Invention

This invention relates to a system for monitoring the transmission capability of power transmission lines. More particularly the invention is directed to an apparatus and method for determining the current carrying capacity of power lines which is limited by the allowable sag of the line between transmission towers. To control the load on a power line it is necessary to know the condition of the line in terms of the sags of the different spans. The present invention may incorporate the method and apparatus set forth in applicants U.S. Pat. No. 5,235,861 entitled Power Transmission Line Monitoring System the disclosure of which is herewith incorporated by reference.

2. Description of the Prior Art

Certain problems associated with overhead power transmission lines regarding sag and clearance between the line and the nearest point on earth, are set forth in applicant's above cited prior patent. This patent also outlines prior art solutions to this problem and cites certain prior patents. The system for measuring power line sag between spans described in the 861 patent employs a novel tension monitoring system in which the line tension of the power line is measured and appropriate calculations are made as outlined in the patent in order to determine sag by which the person controlling the power line can appropriately adjust the load.

The calculations for converting tension to sag or power line capacity, rely upon a concept known in the power transmission art as Ruling Span which is a calculated weighted average of span lengths between deadend power line towers. Ruling span is used to design transmission lines and then subsequently used in monitoring sag of the lines. The Ruling Span between the deadend structures is defined by the following formula.

$$RS = \sqrt{(l_1^3 \ldots l_n^3)/(l_1 \ldots l_n)}$$

in which $l_1 \ldots l_n$ are the span lengths in the ruling span section between deadends. There are several assumptions underlying this concept. The principle ones are the following:

(1) The span lengths between deadends do not vary significantly.

(2) All structures are rigid and the line section is straight, without angle structures.

(3) Insulator strings are long compared to the difference of the thermal expansion between the spans.

(4) Elastic, thermal elongation and creed properties of the conductors are accurately known based on manufacturer's data.

(5) Conditions of the line during sagging are known accurately.

(6) Subsequent events affecting creep of conductors (conductor temperature and tension) can be accurately estimated.

A more detailed description of the Ruling Span concept is described in an article Ruling Span Concept is Reexamined for Sagging Techniques by J. Brian White found in Transmission and Distribution International, September 1992 pages 18 and 19.

If the Ruling Span length and the above properties (4..6) are accurately known, the sag of the conductor in any of the spans of the ruling span section between deadends can be calculated with a high degree of accuracy using commercially available sag/tension programs.

Actual tension measurements on transmission lines have indicated that the above assumptions are often not very reliable. The accuracy becomes quite important when transmission lines are operated in conditions near their specified clearance limits, which are the limiting factors for maximum currents of the transmission line.

Methods exist for determining the sagging accuracy by observations.

The traditional method has been based on daytime observations of either sag of the line using optical devices, such as transits or by observing the propagation velocity of transverse vibration of the conductor (bounce method). Such observations are, of necessity, made during daytime. Sag measurements using such techniques are subject to two main error sources: (1) If the line carries a current, the temperature of the conductor cannot be accurately estimated and (2) even if the line is de-energized, the solar radiation on the conductor can cause up to 15° C. temperature rise compared to ambient.

In the past, the accuracies of the sag measurements by such observations were considered sufficient by electric utilities, because very few lines were ever operated near or at their maximum sag conditions. The recent emphasis of operating lines closer to their thermal limits has brought about the need to increase the accuracy of the calculations.

SUMMARY OF THE INVENTION

The present invention provides a novel method and apparatus for making measurements of a power transmission line from which Ruling Span length can accurately be calculated. With this calculation it is then possible to determine the maximum current carrying capacity of the power line in order to avoid exceeding maximum sag.

More specifically the present invention contemplates measuring the tension of a particular section of transmission line as well as the ambient temperature at two different times. From these measurements, Ruling Span length is then calculated.

Thus an object of the present invention is to determine or verify the actual Ruling Span length of a section of a power transmission line.

A further object of the present invention is to provide a method and apparatus for accurately determining the Ruling Span length of a transmission line.

A still further object of the present invention is to accurately determine Ruling Span length in order to calculate the maximum current capability of a transmission line in order to avoid exceeding maximum sag of the line.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein in which.

DESCRIPTION OF A PREFERRED EMBODIMENT

The apparatus for measuring the tension of a power line for purposes of the present invention may take any convenient form as for example that shown in applicant's U.S. Pat. No. 5,235,861.

Figure 1:
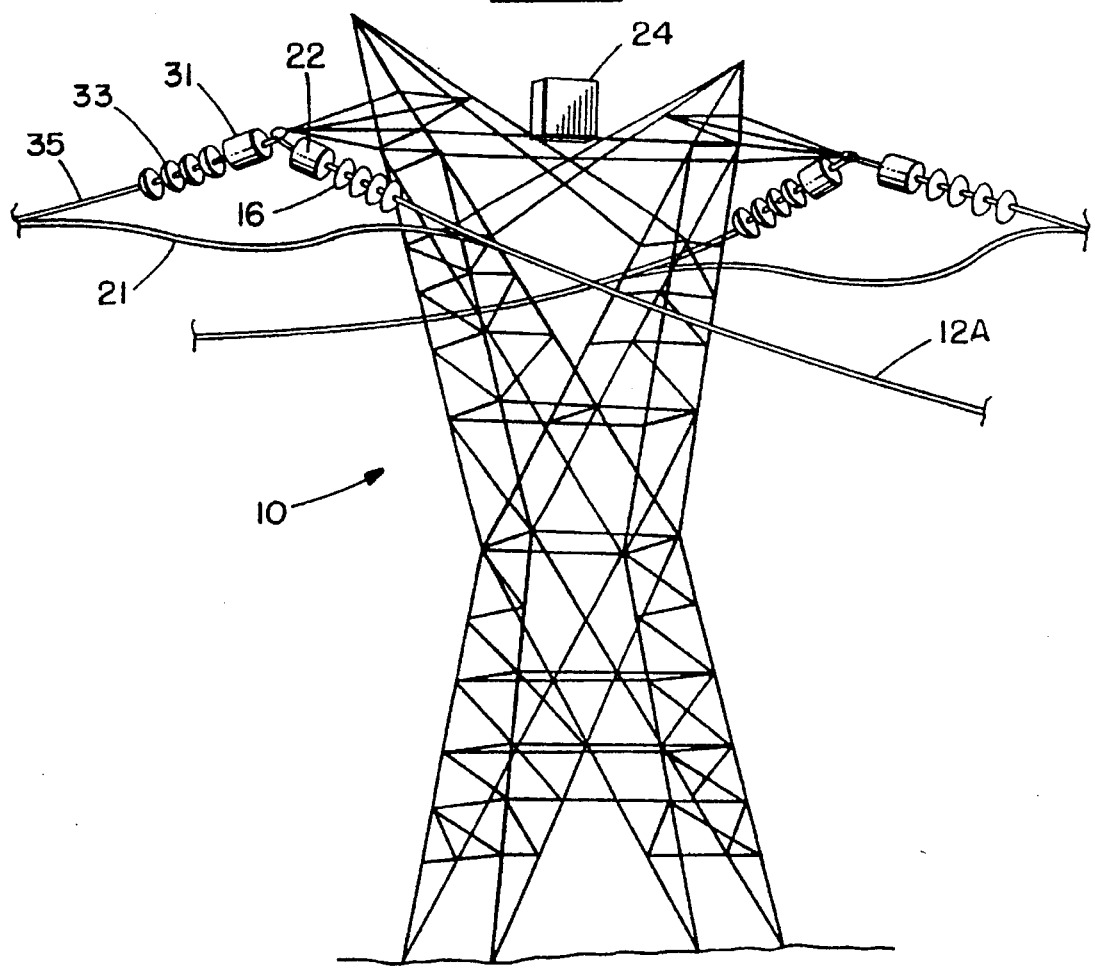
FIG. 1 is a view of a transmission tower having electric power transmission lines showing schematically the system of the present invention.
Figure 2:
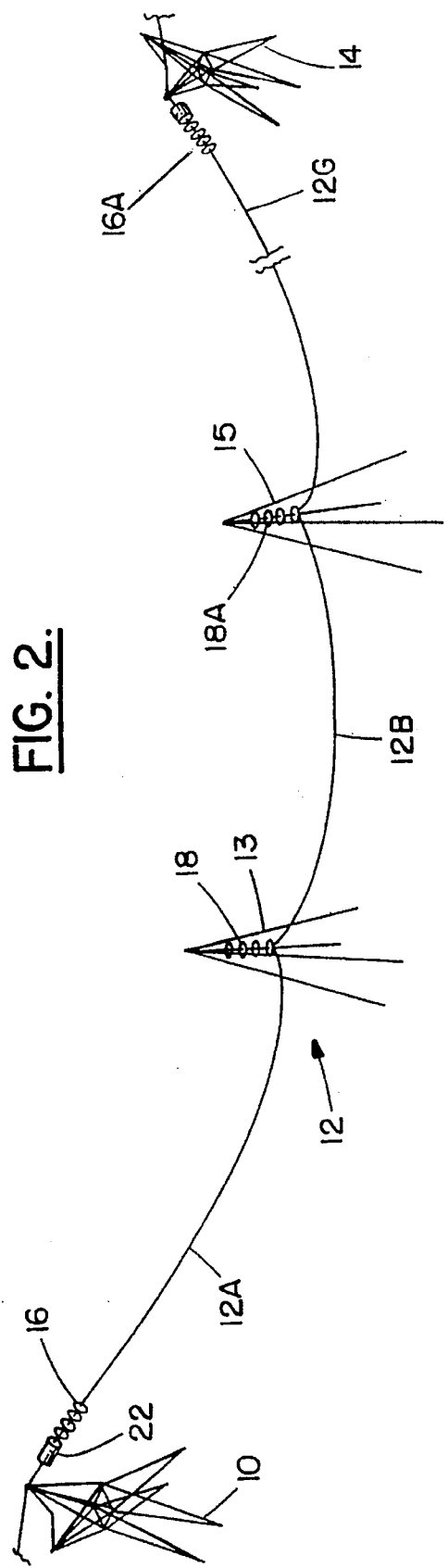
FIG. 2 is a portion of a transmission line suspension system.

Referring to FIGS. 1 and 2, 10 indicates a transmission tower that terminates a suspension section of a power transmission line generally indicated by 12. The section is made up of a number of suspension spans 12A, 12B to 12G which terminate at its tower 14. The terminal ends of the section are secured to their respective towers 10 and 14 through strain insulator strings, also known as dead end strings 16 and 16A. The intermediate suspension spans are secured to their respective towers by suspension strings in such a manner that the ends of the spans may move laterally and longitudinally.

For example, span 12B is secured at its ends to suspension strings 18 and 18A which are suspended in a vertical manner to their respective towers represented diagrammatically, as 13, 15. Thus the strain structures 16, 16A are subject to the full tension of the line Because the suspension strings 18, 18A hang from their respective towers permitting longitudinal movement of the end of the sections, the horizontal tension equalizes and is substantially constant throughout the suspension section.

One end of each suspension section has a tension measuring device interposed between the strain insulator and the associated tower.

Thus the end of the section of powerline 12 joins to tower 10 through the strain insulator 16 and the tension measuring device 22. The latter may be a load cell of the strain gauge type and it has been found that a commercially available load cells such as the Revere USP Series are very satisfactory for this purpose. Although the line 12 secures to tower 10 it does not terminate but rather continues on to the next adjacent tower as shown by conductor 21 in FIG. 1.

As the temperature varies, the powerline 12 will expand or contract with a corresponding change in tension. The tension will substantially equalize throughout the length of the section because of the suspension string sections 18, 18A, etc. and this tension will be measured by load cell 22. The latter is connected to a console 24 by a shielded cable 26 and is secured to any convenient position on the transmission tower 10.

Figure 3:
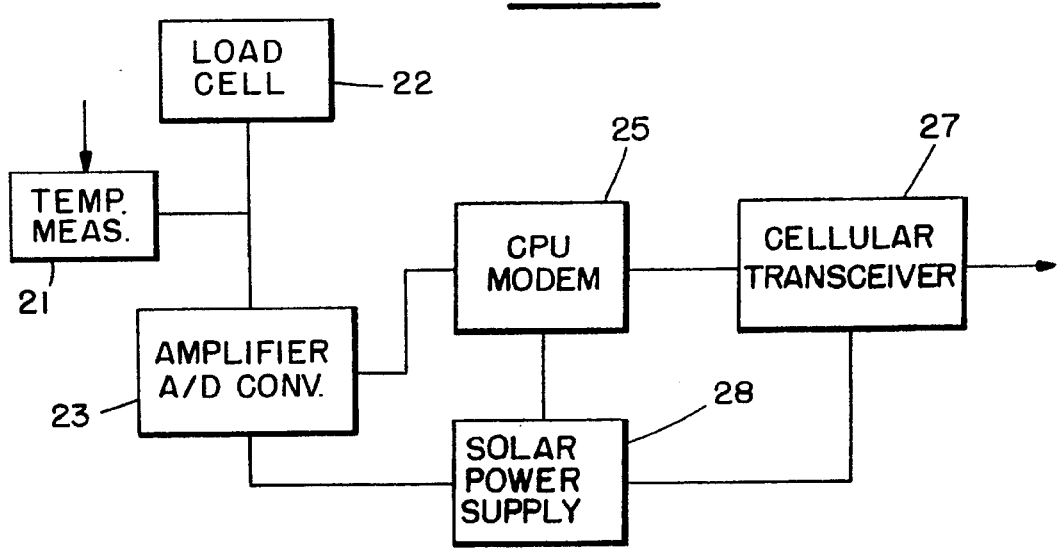
FIG. 3 is a general block diagram of the components of a sensor module.
Figure 4:
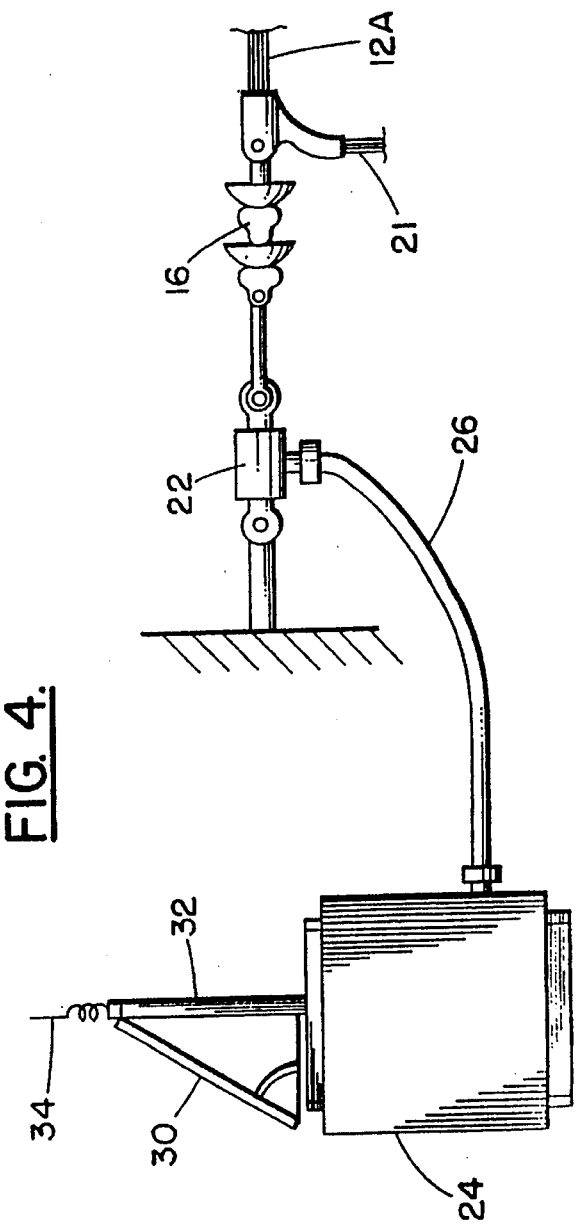
FIG. 4 is a schematic view of the sensor and associated module.

The console 24 will contain the various electrical components shown in FIG. 3. The analog signal from the load cell 22 is passed to an amplifier and then to bridge amplifier and A/D converter 23 which converts it to digital form. This digital signal is then connected to a CPU 25 where it is appropriately processed as will be hereinafter described and passed through to a cellular transceiver 27. The various components of the module are powered by a solar power supply 28. The latter is shown in FIG. 4 as a solar array 30 held up by a mast 32 which also supports the cellular transceiver antenna 34.

The console 24 will also contain a temperature measuring device (21) that may continually monitor the ambient temperature. The output signal of 21 is similarly processed and passed through cellular transceiver 27.

Thus both tension and ambient temperature are monitored by the system and the results may be transmitted through the cellular transmission link to a central station where the information is used for appropriate calculations hereinafter described.

It is understood that the operation of the transmission system contemplates a maximum ampacity or $I_{max}$ above which the sag of a line section will exceed the maximum permitted determined by the surrounding objects and their distance from the transmission line. Thus the present system serves to determine the maximum ampacity by suitable calculations.

Ruling Span can be determined from two temperature measurements and tension measurements by the theoretical derivation hereinafter described. Accordingly, the present invention contemplates the appropriate measurement of temperatures and line tensions to make accurate calculations of the Ruling Span.

The present process contemplates the following steps:

1. The transmission line is taken out of service so that no current passes through the line for a period of time sufficient for the conductor to cool to ambient temperature. At the end of this time, the system records the tension $T_1$ and ambient temperature $t_{a1}$.
2. The transmission line is taken out of service at another occasion. The system records the tension $T_2$ and ambient temperature $t_{a2}$.
3. The Ruling Span is then calculated using the formula hereinafter described.
4. A new sag/temperature table is calculated using the Ruling Span calculated from Step 3 above.

The Ruling Span length calculation of Step 3 is based upon the following:

When a conductor is suspended in a span of length L it forms a catenary in which the length of the conductor is L+s where s is the slack. If the weight of the conductor per unit length is m and the horizontal component of its tension is H, the catenary constant C=H/m.

Although the shape of the catenary is actually a hyperbolic cosine, its geometry can be closely approximated by a parabola. The parabolic approximation results in an error of less than 0.5%, if the sag of the span is less than 6% of its length.

Using the parabolic approximation, one can define the percentage slack of the span is $$\%s = s/L = L^2/24C^2$$

For line sections consisting of multiple spans between two dead ends, called Ruling Span sections, the Ruling Span is defined as a span length which has the same percentage slack as the ruling span section.

If the conductor temperature changes, from $t_1$ to $t_2$ corresponding to catenary constants of $C_1$ and $C_2$ the slack changes:

$$d\%\text{slack} = L^2/24C_1^2 - L^2/24C_2^2$$

On the other hand the change of slack is the difference between the thermal elongation $\Delta_t$ and the elastic elongation $\Delta_e$:

$$\Delta_t - \Delta_e = \beta \Delta t - (T_1 - T_2)/EA, \text{ in which}$$

$\beta$ is the coefficient of thermal elongation, E is Young's modulus of conductor and A is the area of the conductor's cross section. These quantities are generally known from the manufacturers' data.

If the line is taken out of service at night, with no current and no solar radiation, conductor temperatures $t_1$ and $t_2$ are essentially equal to ambient temperatures $t_{A1}$ and $t_{A2}$ and hence $\Delta t = \Delta tA$.

It is now possible to write the quivalency:

$$\beta\Delta t - (T_1 - T_2)EA = ((RS)^2/24)(1/C_1^2 - 1/C_2^2),$$

from which one can determine the ruling span length as:

$$RS = \sqrt{24(\beta\Delta t - (T_1 - T_2)/EA)/(1/C_1^2 - 1/C_2^2)}.$$

For example, the Aluminum Company of America provides a sag tension table for a 1000 ft. span of conductor designed ACSR Drake, 795.0 KCMIL, 26/7 stranding for which the stress-strain data is as follows:

Thus the Ruling Span length can be solved from the above equation if tension of the span is known at two different temperatures.

With the Ruling Span of the particular powerline section known, the tension/sag table can be calculated.

| FINAL | | INITIAL | |
| --- | --- | --- | --- |
| SAG FT | TENSION LB | SAG FT | TENSION LB |
| 24.99 | 12592. | 24.97 | 12600. |
| 18.79 | 7292. | 16.99 | 8060. |
| 20.84 | 6578. | 18.64 | 7350. |
| 22.86 | 5999. | 20.35 | 6735. |
| 24.82 | 5527. | 22.08 | 6209. |
| 26.72 | 5137. | 23.81 | 5760. |
| 28.79 | 4771. | 25.75 | 5329. |

Having thus described the invention with particular reference to the preferred forms thereof, it will be obvious that various changes and modifications may be made therein without departing from the spirit and scope of the invention as defined.

What is claimed is:

1. The method of determining the Ruling Span of an electrical power line suspension section comprising the steps of:

discontinuing the transmission of electrical current through the power line for a period of time sufficient for the power line to cool to substantially ambient temperature;

measuring the temperature and tension of the power line to ascertain a first conductor temperature and tension;

discontinuing the transmission of electrical current through the power line a second time for a period of time sufficient for the power line to cool to substantially ambient temperature;

measuring the temperature and tension of the power line to ascertain a second conductor temperature and tension; and calculating the Ruling Span and sag of the power line suspension.

2. The method of determining the Ruling Span of a power line suspension section in which the Ruling Span is defined by the formula:

$$RS\sqrt{\Sigma(l_1^3 \ldots l_n^3)/\Sigma(l_1 \ldots l_n)}$$

in which $l_1 \ldots l_n$ are the individual span lengths in the suspension section comprising the steps of measuring the tension $T_1$ and temperature $t_{a1}$ of the section conductor with no current passing through the conductor, measuring the tension $T_2$ and temperature $t_{a2}$ of the section conductor at a different time with no current passing through the conductor;

calculating the Ruling Span by the following formula $$RS = \sqrt{24[\beta\Delta t - (T_1 - T_2)/EA]/(1/C_1^2 - 1/C_2^2)}$$

in which
   $\beta$ = coefficient of thermal elongation
   E = Youngs Modulus of the conductor
   A = cross section of the conductor
   C = catenary constant calculating a tension/sag table for the suspension section.

3. A system for determining the sag of an overhead power transmission suspension section comprising:

a power transmission section having two terminal ends;

tension measuring means connected to the transmission section to produce a first electrical signal representative of the power line tension;

temperature measuring means connected to the transmission section to produce a second electrical signal responsive to the temperature of the suspension section;

means whereby said tension measuring means and said temperature measuring means simultaneously measure the tension and temperature of the said transmission section whereby said first and second electrical signals are responsive to the simultaneous measurements; and means to transmit said first and second electrical signals to a distant location for processing to determine the sag of the suspension section.

4. The system set forth in claim 3 including transceiver means connected to receive the first and second signals and transmit them to the distant location; and means at the distant location to transmit control signals to the transceiver means.

* * * * *